Dec. 21, 1965
TAKAO ITO
3,224,820
SPINDLE INSERT
Filed Aug. 19, 1963
2 Sheets-Sheet 1
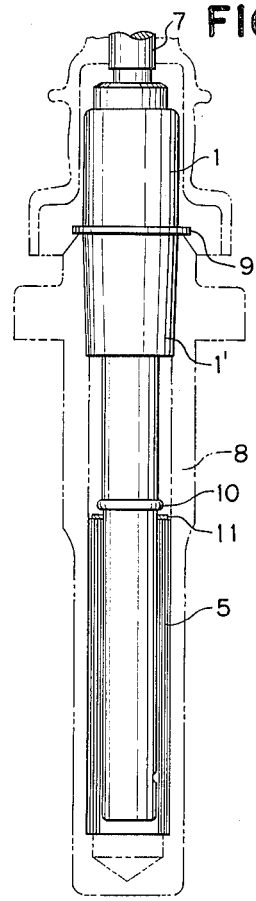
FIG. 1
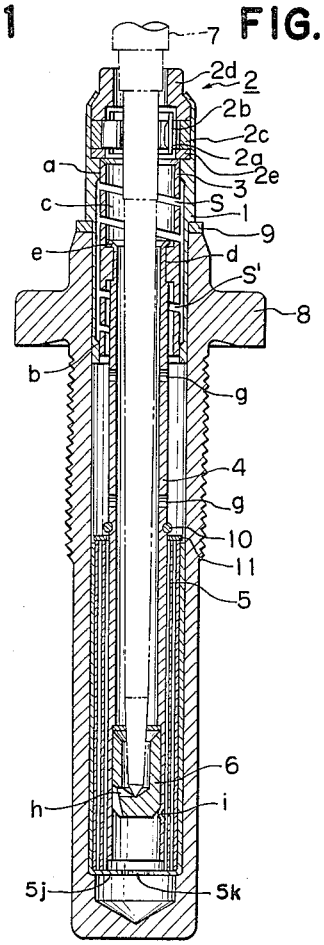
FIG. 2
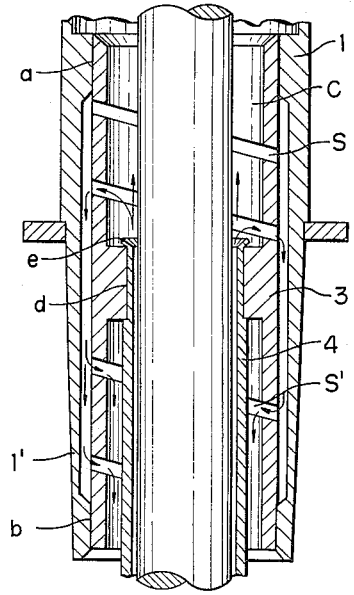
FIG. 3
FIG. 4
FIG. 5
FIG. 6
INVENTOR.
TAKAO ITO
BY
ATTORNEY Dec. 21, 1965  TAKAO ITO  3,224,820
SPINDLE INSERT Filed Aug. 19, 1963  2 Sheets-Sheet 2

INVENTOR
TAKAO ITO
BY

INVENTOR

United States Patent Office 3,224,820
Patented Dec. 21, 1965

3,224,820
SPINDLE INSERT
Takao Ito, Kohoku-ku, Yokohama-shi, Japan, assignor to Nippon Seiko Kabushiki Kaisha, Tokyo, Japan, a corporation of Japan
Filed Aug. 19, 1963, Ser. No. 303,106
5 Claims. (Cl. 308—155)

The invention relates to spindle inserts for spring frames and twisting frames.

The principal object of the invention is to provide an improved form of mounting for the spindles of textile spinning machines and twisting machines for efficiently preventing the spindles from external vibration either transmitted through the frame of the machine or resulting from unbalanced packages, the generation of heat and defective lubrication when the spindle blade is rotated at high speed under heavy loads.

In the endeavor to solve the problems above mentioned, i.e., to eliminate detrimental effects on the spindle as much as possible, various structural changes have been proposed, including changes in the neck and footstep bearings themselves, and in their direct or indirect mounting in the spindle bolster. These structural changes have not included any essential changes in the spindle bolster, and the previous proposals have not proved thoroughly satisfactory in practice.

It is also known to cut a helical groove at the middle of the centering sleeve, i.e. the inner tube itself, to give elastic flexibility to the inner tube. Such a construction is disclosed, for example, in U.S .Patent 2,750,239 issued to Ernst Rogner et al., on June 12, 1956.

However, to cut the helical groove in the wall of the inner tube itself would lessen the strength of the inner tube, which usually has a thin wall. Furthermore, the nature of the inner tube does not allow the helical groove to be heat-treated and, besides, the distance between the neck bearing and the portion of the helical groove is rather long, which results in a notably high internal stress at the portion of the helical groove. Because of these reasons the inner tube of this prior type is easily deformed and retains a permanent deformation by an occasional and extraordinary movement of blade, which is frequently experienced in practice.

The spindle insert according to the invention comprises a bearing case having a ball or roller bearing in its upper end, the lower external end of the bearing case being press-fitted into the spindle bolster, a spring sleeve which is tightly press-fitted within the bearing case and which is flexible and resilient within the bearing case inside the bolster, an inner tube, the upper end of which being held by the middle bore of the spring sleeve and which supports a foot-step bearing for the foot of the spindle, and damping means for the inner tube located between the lower end portion of the bolster and the inner tube.

According to one embodiment of the invention, the spring sleeve is made of spring steel, properly hardened and drawn to maintain a predetermined spring characteristic for long time use, which has a spiral or helical groove cut at both ends thereof to obtain the requisite elastic flexibility.

The spindle insert according to the invention ensures elastical holding of the foot-step bearing relative to the bearing case in the upward, downward and radial directions, whereby the foot-step bearing is always concentrically held relative to the bearing case.

It will be understood that the foregoing general description as also the following detailed description, are illustrative and explanatory of the invention and in no way restrictive thereof.

The invention will be better understood from the following description, reference being had to the accompanying drawing in which:

FIG. 1 is an external view of the spindle insert according to the invention with a vertical section of the damping sleeves;

FIG. 2 is a vertical section of the spindle insert of FIG. 1;

FIG. 3 is an enlarged vertical sectional view of the upper part of the insert of FIG. 1;

FIG. 4 is an enlarged vertical sectional view of the lower part of the insert of FIG. 1, the damping sleeves shown therein being multi-layer sleeves;

FIGS. 5 and 6 are schematic drawings of the suspension systems of the foot-step bearing relative to the upper roller bearing according to the invention and the prior art, respectively;

Figure 7B:
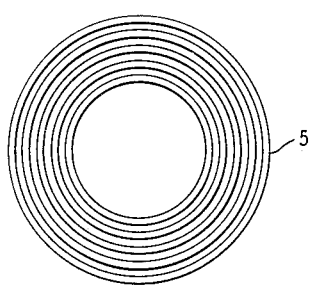
Figure 7C:
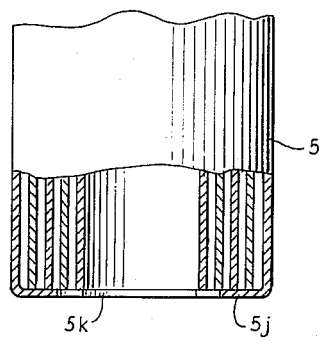
Figure 7A:
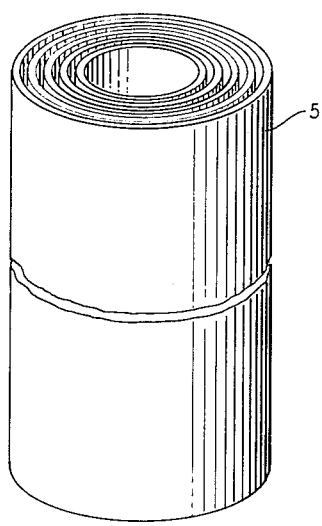
Figure 7D:
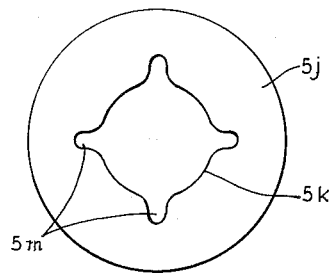
Figure 8A:
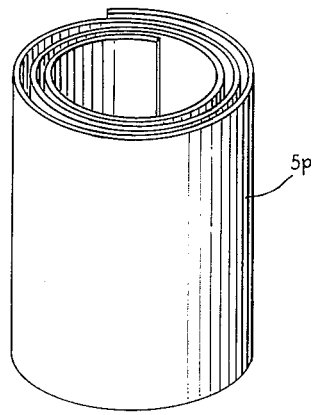
Figure 8B:
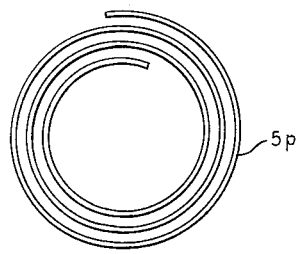
Figure 8B:

FIGURE 7A is an elevational perspective of one form of the damping sleeve assembly of my invention, with FIGURE 7B a top plan view thereof, FIGURE 7C an elevational section, partially broken away, of the outermost damping sleeve per se of the sleeve assembly, and FIGURE 7D a bottom view of FIGURE 7C; and FIGURE 8A is a perspective elevational view of another illustrative embodiment of the damping sleeve of my invention with FIGURE 8B a plan view thereof.

Referring to the drawing, bearing case 1 contains a roller bearing 2 in its upper end. Bearing 2 consists of a set of rollers 2a, cage 2b, outer race 2c, upper sleeve 2d and bottom washer 2e. The lower external end 1' of bearing case 1 is slightly tapered so as to be press-fitted into the tapered bore of bolster 8 until it is stopped by stop washer 9.

Into the bore portions a and b of bearing case 1, spring sleeve 3 is tightly press-fitted (FIGS. 2 and 3). Spring sleeve 3 holds by its middle bore d holds the upper end of inner tube 4 which is tightly press-fitted into d with its uper edge e to avoid looseness. Spring sleeve 3 has separate spiral or helical grooves S and S', respectively, groove S being provided at the upper portion and groove S' being at the lower portion of the sleeve 3.

Foot-step bearing 6 is press-fitted into the lower end bore of inner tube 4 (FIG. 2). The lower external end of inner tube 4 has three dimples i to hold foot-step bearing 6 tight against the weight of blade 7 and bobbin (not shown) as well as against the downward force which would be exerted by blade 7 at the time of doffing, i.e. replacing, the full bobbin by an empty bobbin.

Between the lower end bore of bolster 8 and inner tube 4, there are fitted five layers, i.e. 5a, 5b, 5c, 5d and 5e, of concentric lamping sleeves 5, with each layer being housed within the other as best seen in FIG. 4. Retaining ring 10 snap-fitting into the groove provided half way up inner tube 4, and retaining washer 11 as well, hold damping sleeves 5 in position. This plurality of damping sleeves, 5a–5e, preferably have completely open bottoms with the exception only of outer sleeve 5 of the assembly which has supporting bottom 5j with central aperture 5k, the latter being shown in FIG. 7D with a plurality of spaced radial spoke-like grooves 5m for flowing lubricant into the inner sleeves of the plurality. Central aperture 5k with grooves 5m is preferably circular but may be of any desired shape which will permit bottom 5j to support the inner sleeves thereon.

A proper amount of lubricant oil is filled into bolster 8 to immerse the lower part of inner tube 4, foot-step bearing 6 and damping sleeves 5 in oil.

Spring sleeve 3 is made preferably of spring steel and is hardened so as to have a proper predetermined springy characteristic. Rollers 2a, outer race 2c, upper sleeve 2d and bottom washer 2e are also hardened and ground to give them a smooth surface finish.

Concentric damping sleeves 5 can be replaced by a spirial damping sleeve 5 which may be made of a single metal sheet 5p as shown in FIGURES 8A and 8B, which obviously requires no supporting bottom.

With the construction described above, blade 7 is held by foot-step bearing 6 at its lower end, and by roller bearing 2 at its neck. By means of spring sleeve 3 having two helical grooves S and S', foot-step bearing 6 is elastically held relative to bearing case 1 in the upward, downward and radial directions. The suspension system of the foot-step bearing relative to the roller bearing according to the invention can be expressed as shown in the schematic of FIG. 5. Blade 7 is supported at roller 2a of bearing 2 and foot-step bearing 6. Spring sleeve 3 is supported within bearing case 1 fitted into bolster 8, at annular shoulder portions $a$ and $b$ thereof. Inner tube 4 is held by spring sleeve 3 at middle bore $d$ thereof. Spiral grooves S and S' are schematically shown in the form of separate springs positioned above and below the intermediate bore $d$ of spring sleeve 3, respectively, surround inner tube 4 within which blade 7 is positioned. The prior suspension system disclosed in aforementioned U.S. Patent 2,750,239 is schematically expressed in FIG. 6, namely, the blade is supported at a neck bearing and a foot-step bearing, respectively, the inner tube having one helical groove provided within the wall of the inner tube which is rigidly supported at the upper end thereof; the helical groove being shown as a spring in FIG. 6.

In comparing these systems shown in FIGS. 5 and 6, respectively, it is obvious that distance $l$ between the upper bearing and the point intermediate the spring or helical groove is much shorter in the instant inventive structure than in the prior suspension system. It is apparent that when distance $l$ is shorter, the internal stress produced at the spring portion is less. This is essentially due to the structural difference between the inventive and the prior art structures.

Now assuming the case that the longitudinal axis of the blade happens to incline at a certain angle from the vertical line. Comparing both suspension systems, it is obvious that foot-step bearing according to this invention can more easily follow this inclination in all upward, downward and radial directions than the bearing according to the prior art, because the distance $l$ of the inventive structure being shorter than that of the prior art, the spring action owing to the double helical grooves of the spring sleeve surrounding the inner tube is more effective than that obtained by the single helical groove provided within the inner tube itself. Furthermore, the spring sleeve made of spring steel according to the invention, which can be hardened, gives more uniform and larger resiliency in comparison with the helical groove provided within the inner tube and which obviously can not be heat-treated. According to the latter, the soft spring would have but weak strength to resist inclination of the blade and would retain a permanent deformation by an extraordinary movement of the blade. When the insert is used for, for example, spinning machine, an empty bobbin is attached at the upper region of the blade and a metal ring is usually provided around the bobbin which will be close to and near the thread when the thread is wound up about the bobbin. Therefore, if the blade be permanently inclined or deformed to an excessive degree, this causes the thread being wound up about the bobbin to touch the inside surface of the ring thereby deteriorating the quality of thread.

According to the invention, the vibration of the blade is effectively dampened by the use of spring sleeve 3. Experimental data shows that the insert of the invention reduces the amplitude of the vibration by about 10% in comparison with the prior art, taken at 1,000 to 16,000 r.p.m. of the spindle. According to the invention, the radial vibration caused by the high speed rotation of the blade is effectively dampened by the concerted damping effect of damping sleeve 5 and the lubricant oil.

The lubrication of roller bearing 2 is provided by oil climbing up on the slightly-tapered external surface of rotating blade 7 up to the height of the bearing. Any excess amount of oil is thrown out on the way to space $c$ by centrifugal force, and through grooves S and S' is returned to the bottom reservoir as the arrow heads in FIGURE 3 indicate. Therefore, only just about the necessary amount of oil will be utilized for bearing lubrication, and this makes the lubricant consumption quite low compared to the insert without the provision of space $c$ and grooves S and S'. The space $c$ and grooves S and S' are also useful as safety spaces to prevent the oil from climbing up beyond roller bearing 2, which should be avoided from the very nature of spindle inserts. This kind of space could hardly be provided with the insert of the prior art mentioned above because of its dimensional limitation. Besides, by the provision in the inventive structure (FIGURE 2) of oil holes $g$ half way down inner tube 4 and of oil hole $h$ at foot-step bearing 6, the oil freely recirculates within bolster 8, thus lubricating the foot-step bearing.

What I claim is:

1. A spindle mounting for textile spinning and twisting machines comprising a spindle supporting bolster, a bearing casing, a bearing in the upper end region of the casing, the lower end of the casing press-fitted into the spindle bolster, a spring sleeve having an inner bore, the sleeve being tightly press-fitted in the casing and the adjacent portions of the bolster and having a helical groove in both its end portions to obtain requisite flexibility, an inner tube of which the upper end is held by the inner bore of the spring sleeve, a foot-step bearing in the inner tube for the lower end of a spindle, and damping means for the inner tube located between the lower end portion of the bolster and the inner tube.

2. A spindle mounting according to claim 1 in which the spring sleeve is of spring steel properly hardened to maintain the predetermined springy characteristic thereof for a long time of use.

3. A spindle mounted according to claim 1 in which the spring sleeve is tightly press-fitted in the bearing casing at its upper and lower end portions within the casing, the intermediate portion of the outer surface of the sleeve and the interior surface of the casing being spaced from each other and forming a passage for the downward flow of excess lubricating oil applied to the spindle.

4. A spindle mounted according to claim 1 in which the damping means comprises a plurality of layers of concentric damping sleeves, each of the damping sleeves succeeding the outermost layer being housed within the immediately preceding layer in the direction inwardly.

5. A spindle mounting according to claim 1 in which the damping means comprises a single sheet metal spiral sleeve of a plurality of turns.

References Cited by the Examiner
UNITED STATES PATENTS 2,973,229   2/1961   Rogner _____ 308—152
3,065,593   11/1962  Westall et al. _____ 57—135

DON A. WAITE, *Primary Examiner.*
FRANK SUSKO, *Examiner.*